US010146242B2

(12) United States Patent
Steffen et al.

(10) Patent No.: US 10,146,242 B2
(45) Date of Patent: Dec. 4, 2018

(54) MICRO GRID POWER SYSTEM

(71) Applicant: Caterpillar Inc., Peoria, IL (US)

(72) Inventors: Joshua W. Steffen, El Paso, IL (US);
Gregory S. Hasler, Pekin, IL (US);
Dachuan Yu, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 128 days.

(21) Appl. No.: 15/246,909

(22) Filed: Aug. 25, 2016

(65) Prior Publication Data

US 2018/0059700 A1    Mar. 1, 2018

(51) Int. Cl.
| | | |
|---|---|---|
| G05F 1/66 | (2006.01) | |
| H02K 7/18 | (2006.01) | |
| H02J 3/38 | (2006.01) | |
| H02J 3/46 | (2006.01) | |
| G05B 23/02 | (2006.01) | |

(52) U.S. Cl.
CPC .......... *G05F 1/66* (2013.01); *G05B 23/0289* (2013.01); *H02J 3/38* (2013.01); *H02J 3/383* (2013.01); *H02J 3/46* (2013.01); *H02K 7/1815* (2013.01); *G05B 2219/32184* (2013.01)

(58) Field of Classification Search
CPC ... G05F 1/66; H02P 9/008; H02J 3/383; H02J 3/46; H02K 7/1815; G05B 23/0289; G05B 2219/32184
See application file for complete search history.

(56) References Cited

U.S. PATENT DOCUMENTS

| | | | | |
|---|---|---|---|---|
| 8,004,099 | B2 * | 8/2011 | Yuri | F02D 29/06 |
| | | | | 123/305 |
| 8,963,349 | B2 | 2/2015 | Frampton et al. | |
| 2002/0078681 | A1 * | 6/2002 | Carberry | F02D 41/024 |
| | | | | 60/280 |
| 2010/0094490 | A1 * | 4/2010 | Alston | B63H 21/17 |
| | | | | 701/21 |
| 2011/0074165 | A1 | 3/2011 | Grimes et al. | |
| 2013/0227954 | A1 * | 9/2013 | Marini | F02C 9/20 |
| | | | | 60/773 |
| 2013/0327052 | A1 * | 12/2013 | O'Neill | F02C 6/18 |
| | | | | 60/772 |

(Continued)

FOREIGN PATENT DOCUMENTS

| | | | | |
|---|---|---|---|---|
| GB | 405863 | | 2/1934 | |
| JP | 2014114707 | | 6/2014 | |
| WO | WO -2017089402 | A1 * | 6/2017 | ............. H02J 3/383 |

*Primary Examiner* — Thomas C Lee
*Assistant Examiner* — Tri T Nguyen

(57) ABSTRACT

A micro grid power system includes a plurality of generator sets, a photovoltaic system, an external load, and a controller. Each generator set includes an engine and a sensor to determine a temperature of exhaust gases exiting the engine. The photovoltaic system includes a plurality of photovoltaic panels for generating power. The external load is powered by the plurality of generator sets and the photovoltaic system. The controller is configured to determine the external load, and control the plurality of generator sets to maintain the temperature above a threshold temperature. The controller is further configured to determine a remaining load which is the external load subtracted by a portion of the external load powered by the plurality of generator sets, and control the photovoltaic system to power the remaining load.

4 Claims, 3 Drawing Sheets

(56) References Cited

U.S. PATENT DOCUMENTS

2014/0338864 A1\* 11/2014 Danforth, III ...... F02D 41/0245
  165/104.19
2015/0021925 A1 1/2015 Stengl et al.

\* cited by examiner

MICRO GRID POWER SYSTEM

TECHNICAL FIELD

The present disclosure relates to a micro grid power system having a plurality of generator sets, and more particularly to a method and system for operating the micro grid power system to prevent slobber in an exhaust system of the generator sets.

BACKGROUND

A generator set includes a combination of a generator and a prime mover, for example a combustion engine. The generator and the prime mover are mounted together along with other accessories on an anchor platform to form an integral unit commonly known as a genset. As fuel is burned within the prime mover, a mechanical rotation is created that drives the generator to produce electrical power. In typical implementations, one or more generator sets are arranged to supply generated electrical power to one or more connected loads through a shared or a common bus. Generally, the power output of the prime movers associated with corresponding generator sets is controlled based on a power needed to operate the connected loads.

However, during low load conditions, controlling the power output of the engines based on the power needed to operate the connected loads may lead to a decrease in temperature of exhaust gases exiting the engines. In some situations, the temperature of the exhaust gases in an exhaust conduit may go below the condensation temperature of oil and/or unburned fuel present in the exhaust gases. In such cases, the condensation of the oil or the unburned fuel inside the exhaust conduit may lead to accumulation of oil in the exhaust conduit. This may cause leakage of the condensed oil from various joints of the exhaust conduit of an exhaust system. Further, the accumulation of the oil or the unburned fuel may cause damage to exhaust aftertreatment systems. The condensation or the accumulation of the oil or the unburned gases in the exhaust conduit is generally referred to as wet stacking or slobber.

One way to avoid wet stacking is to operate the engine at a fixed minimum power output so that the engine will not drop below that minimum power which ensures that the temperature of the exhaust gases in the exhaust conduit can be maintained high enough that wet stacking does not occur. However, this leads to an increase in fuel consumption of the generator sets. Where generator sets are being operated with additional power sources, such as a photovoltaic system, operating the engines at a fixed minimum power not only increases fuel consumption but the usage of the photovoltaic system is not optimized.

US Patent Application No. 2014/0338864 discloses a load bank connected to a generator set to increase engine exhaust temperature in order to avoid wet stacking in the engine exhaust system. The load bank includes heating elements, such as one or more resistive elements, inductive elements, capacitive elements, to absorb electric power and convert the electric power into heat. Although the US Patent Application No. 2014/0338864 discloses increasing the engine exhaust temperature to prevent wet stacking by connecting the load bank, this results in increased power output—thereby increased fuel consumption.

SUMMARY OF THE INVENTION

According to an aspect of the disclosure a micro grid power system is disclosed. The micro grid power system includes a plurality of generator sets, a photovoltaic system, an external load, and a controller. Each generator set includes an engine and a sensor to determine a temperature of exhaust gases exiting the engine. The photovoltaic system includes a plurality of photovoltaic panels for generating power. The external load is powered by the plurality of generator sets and the photovoltaic system. Further, the controller is configured to determine the external load, and control the plurality of generator sets to maintain the temperature above a threshold temperature. The controller is further configured to determine a remaining load which is the external load subtracted by a portion of the external load powered by the plurality of generator sets, and control the photovoltaic system to power the remaining load.

According to another aspect of the disclosure, a micro grid power system is disclosed. The micro grid power system includes a plurality of generator sets, an external load, and a controller. Each generator set includes an engine, an exhaust stack coupled to the engine to facilitate discharge of exhaust gases exiting the engine, and a sensor to determine a temperature of the exhaust gases in the exhaust stack. The external load is powered by the plurality of generator sets. The controller is configured to determine the external load. The controller is further configured to control the plurality of the generator sets to meet the external load, and maintain the temperature above a threshold temperature.

According to another aspect of the disclosure a method for operating a micro grid power system is disclosed. The micro grid power system includes a plurality of generator sets, a photovoltaic system, and an external load powered by the plurality of generator sets and the photovoltaic system. Each generator set includes an engine and a sensor. The method includes determining, by a controller, the external load, and controlling, by the controller, the plurality of generator sets to maintain the temperature above a threshold temperature. The method further includes determining, by the controller, a remaining load which is the external load subtracted by a portion of the external load powered by the plurality of generator sets, and controlling, by the controller, the photovoltaic system to power the remaining load.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts. Also, wherever possible, the same reference numbers will be used throughout the drawings to refer to the same or the like parts.

Figure 1:
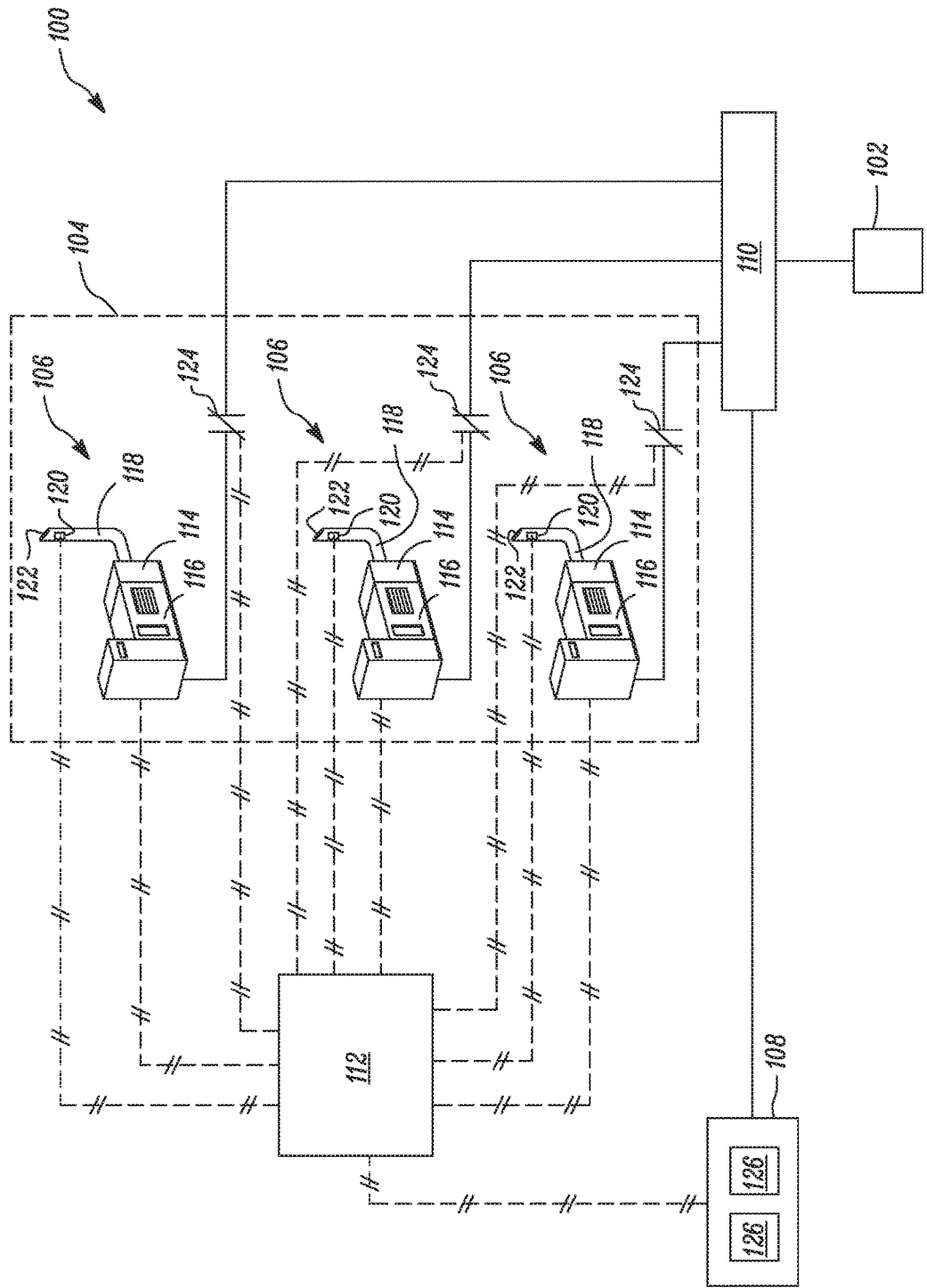
FIG. 1 illustrates a diagrammatic view of a micro grid power system provided with an exemplary generator system and an exemplary photovoltaic system, in accordance with an embodiment of the disclosure.

Referring to FIG. 1, an exemplary embodiment of a micro grid power system 100 is diagrammatically illustrated. The micro grid power system 100 is configured to provide primary and/or back up power to an external load 102. The external load 102 may include any device or devices that require electricity to perform one or more tasks.

As shown in FIG. 1, the micro grid power system 100 includes the external load 102, a generator system 104 having a plurality of generator sets 106, a photovoltaic system 108, a common bus 110, and a controller 112. Each of the plurality of generator sets 106 and the photovoltaic system 108 are coupled to the common bus 110 to supply electrical power to the external load 102. Although three generator sets 106 are shown and contemplated, it may be appreciated that the generator system 104 may include any number of generator sets depending on the needed power generation capacity. Further, it may be appreciated that the number of generator sets 106 that are operating at any moment depends on the power needed to operate the external load 102, and power ratings of each of the generator sets 106 and a maximum power output capacity of the photovoltaic system 108.

Figure 2:
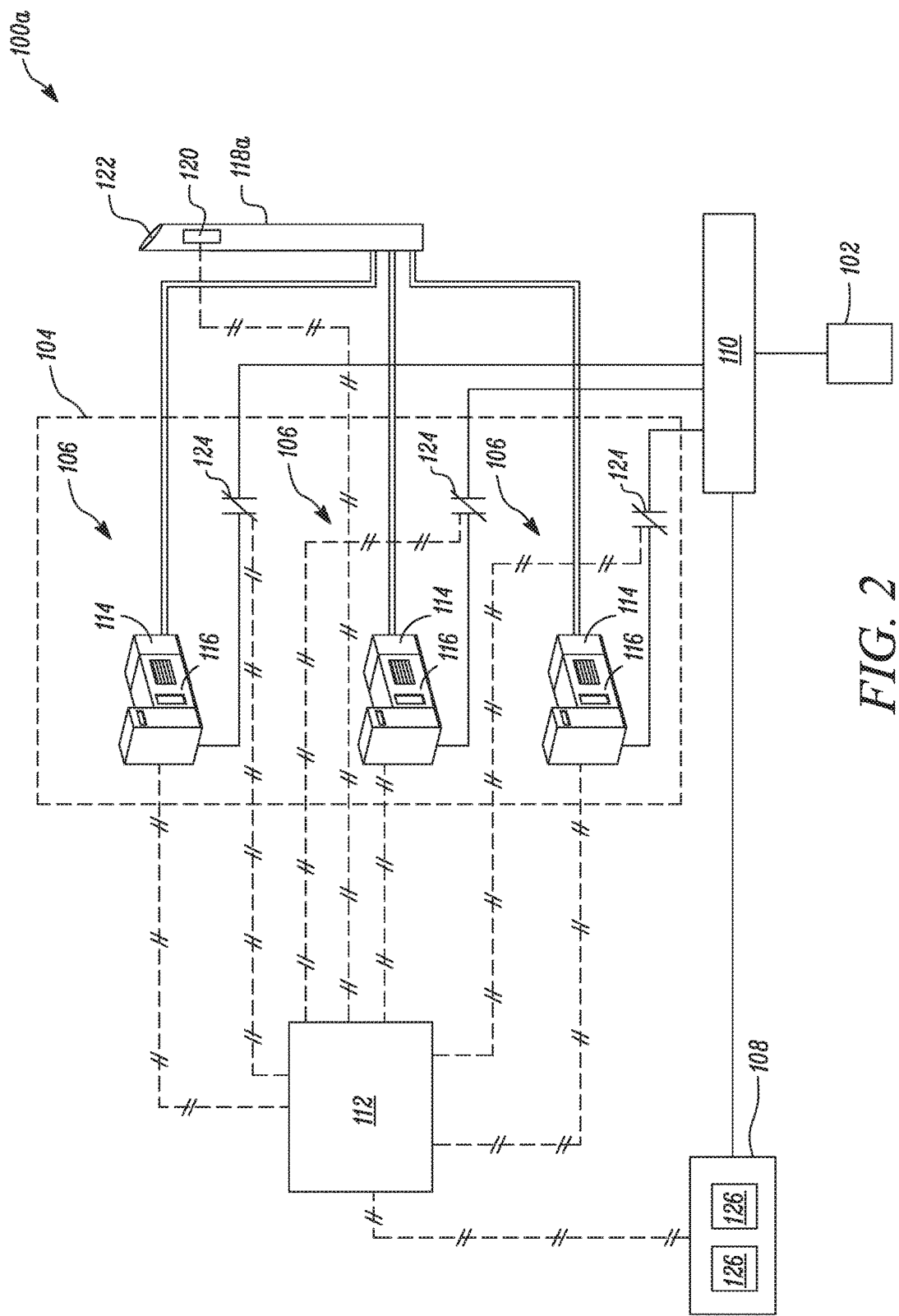
FIG. 2 illustrates a diagrammatic view of an alternative micro grid power system, in accordance with an embodiment of the disclosure.

Further, each generator set 106 includes an engine 114 and a generator 116, which is mechanically driven by the engine 114 to generate electrical power. Each engine 114 includes an exhaust stack 118 coupled to an exhaust manifold of the engine 114, which facilitates discharge of exhaust gases exiting the engine 114 to the atmosphere. Alternatively, as shown in FIG. 2, the generator system 104 include a single exhaust stack 118a coupled to the engine 114 of each generator set 106 via associated exhaust conduits.

Again referring to FIG. 1, each generator set 106 includes a sensor 120 to measure a temperature of the exhaust gases exiting the engine 114. The sensor 120 is positioned inside the exhaust stack 118 at a predefined location. In the illustrated embodiment, the sensor 120 is positioned inside the exhaust stack 118 near an outlet 122 of the exhaust stack 118. Alternatively, the sensor 120 may be positioned inside the exhaust stack 118 at a predetermined distance from the outlet 122. The predetermined distance may be estimated to insulate measurement of the sensor 120 from ambient conditions such as pressure, temperature etc., of the ambient air. In certain implementations, the sensor 120 may be positioned, inside the exhaust stack 118, at a location other than the outlet 122 or near the outlet 122. In such a case, the controller 112 may determine the temperature of the exhaust gases at the outlet 122 by adjusting the temperature, measured by the sensor 120, by various other parameters such as an ambient temperature, a length of the exhaust stack 118 between the sensor 120 and the outlet 122, an ambient pressure, insulation of the exhaust stack 118, etc. The sensor 120 may be a thermocouple or any other suitable sensor for measuring the temperature of the exhaust gases.

Each generator set 106 may also include various control components. For example, each generator set 106 may have a switch 124 connected between its generator 116 and the common bus 110. Each switch 124 may have any configuration that allows selectively electrically connecting the generator 116 to the common bus 110. In an embodiment, the switch 124 may include a circuit breaker. In addition to the switch 124, the control components of each generator set 106 may include one or more information-processing and control devices. For example, each generator set 106 may include a unit controller, which may monitor and/or control one or more aspects of the operation of the engine 114, the generator 116, and the switch 124.

Further, the photovoltaic system 108 includes a plurality of photovoltaic panels 126 having various photovoltaic cells to convert solar energy to electric power. The photovoltaic system 108 further include one or move inverters coupled to one or more photovoltaic panels 126 which receive electric power generated by the associated photovoltaic panels 126. The inverters are configured to convert electric power received from the photovoltaic panels 126 into alternating current (AC) form of electric power, before transmitting the electric power to the external load 102 via the common bus 110.

In an embodiment, the inverters may transfer electric power generated by the photovoltaic system 108 to a utility grid. In an embodiment, the inverters may transfer a portion of the generated electric power to the common bus 110, while a remaining portion of the generated electric power may be transferred to the utility grid. In an embodiment, an energy storage device, such as a battery may be utilized for storing the remaining portion of the generated electric power. Although the photovoltaic system 108 is contemplated, the micro grid power system 100 may include other types of alternative energy generation units such as, but not limited to, a wind turbine, a water turbine, or a combination thereof.

Furthermore, the controller 112 is configured to control the plurality of generator sets 106 and the photovoltaic system 108. The controller 112 is configured is determine the external load 102 connected to the common bus 110, and control the plurality of the generator sets 106 and the photovoltaic system 108 to meet the power required for operating the external load 102. Further, the controller 112 is configured to control various components of each generator set 106 and the photovoltaic system 108. The controller 112 is communicatively coupled to the sensor 120, and receives data from the sensor 120. In some implementations, the controller 112 may include a processor and a memory. The processor may include suitable circuitry that is capable of executing computer readable instructions stored in the memory to perform predetermined operation. For example, the processor may be configured to execute the computer readable instructions to control the operation of the photovoltaic system 108 and the plurality of generator sets 106.

Turning to FIG. 2, an alternative micro grid power system 100a is shown. The micro grid power system 100a includes the external load 102, the generator system 104 having the plurality of generator sets 106, the photovoltaic system 108, the common bus 110, and the controller 112. Each generator set 106 further includes the engine 114, the generator 116, the sensor 120, and the switch 124. Further, the micro grid power system 100a includes the exhaust stack 118a, which is coupled to the exhaust manifold of the engine 114 of each generator set 106. The exhaust stack 118a may be coupled to the exhaust manifold of each generator set 106 by respective exhaust conduits. Therefore, the exhaust stack 118a receives exhaust gases from each of the plurality of the generator sets 106. Thus, the sensor 120 measures a temperature of the collective exhaust gases received from the plurality of the generator sets 106. In such a case, the controller 112 is configured to control the plurality of the generator sets 106 and the photovoltaic system 108 based on the temperature of the collective exhaust gases. In certain implementations, additional sensors may be installed in the exhaust conduits to measure a temperature of the exhaust gases exiting each of the engine 114. In such implementations, the controller 112 may control the plurality of the generator sets 106 and the photovoltaic system 108 based on the temperature measured by both the sensor 120 and the additional sensors.

Figure 3:
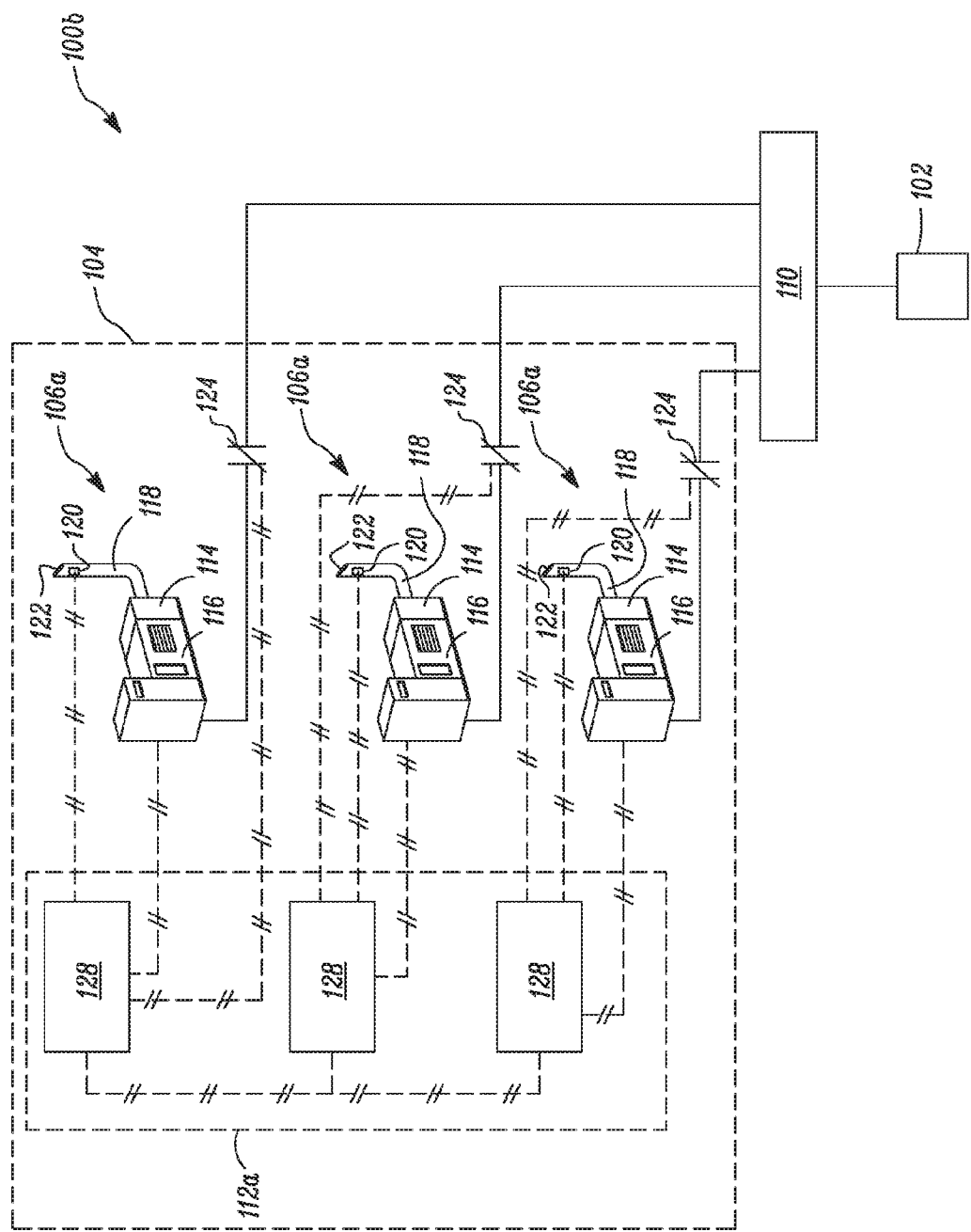
FIG. 3 illustrates a diagrammatic view of an alternative micro grid power system, in accordance with an embodiment of the disclosure.

Referring to FIG. 3, an alternative micro grid power system 100b is shown. The micro grid power system 100b includes a plurality of generator sets 106a, the common bus 110, the external load 102, and a controller 112a. Each generator set 106a includes the engine 114, the generator 116, the exhaust stack 118, the switch 124, the sensor 120, and a control unit 128. The controller 112a includes the control unit 128 of each generator sets 106a, which are in communication with each other. The control unit 128 is configured to communicate the load on its engine 114 to the control units 128 of the other generator sets 106a. Further, the control unit 128 is configured to control the operation of the engine 114 of the associated generator set 106a based on the external load 102 and the temperature of the exhaust gases measured by associated sensor 120. Also, the control units 128 communicate with each other so as to distribute the load on operating generator sets 106a based on the temperature of exhaust gases measured by the respective sensors 120. The load is distributed among the operating generator sets 106a such that the overall efficiency of the micro grid power system 100b is increased. In an embodiment, when there is an increase in the external load 102, it may be desirable to start another generator set 106a. In such a case, the control units 128 of the operating generator sets 106a may communicate with the control units 128 of the non-operating generator sets 106a to start the one or more generator sets 106a depending on an increase in the external load 102. Thereafter, the control units 128 communicate with each other to distribute the load or power among the operating generator sets 106a such that the power required for operating the external load 102 is met, and the temperature of the exhaust gases is maintained above a threshold temperature. The threshold temperature corresponds to temperature of the exhaust gases such that the condensation of a fuel or oil present in the exhaust gases is avoided along the entire length of the exhaust stack 118.

Further, in an embodiment, the sensor 120 may be omitted from the exhaust stacks 118, 118a of the micro grid power system 100, 100a, 100b. In such a case, the controller 112, 112a controls the plurality of generator sets 106, 106a by increasing the load on the operating generator sets 106, 106a after a predetermined time of operation. The controller 112, 112a increases the load on each operating generator set 106, 106a such that the temperature of the exhaust gases exiting the engine 114 increases. The temperature of the exhaust gases is increased to such a level that any condensed oil or fuel present in the exhaust stacks 118, 118a is burned or evaporated, and carried away by the exhaust gases to the atmosphere. The predetermined time duration may be estimated based on experimental data and stored in the controller 112, 112a. Further, the controller 112, 112a may calculate the predetermined time dynamically during running of the generator sets 106, 106a. The controller 112, 112a may calculate the predetermined time based various parameters, such as ambient temperature, ambient pressure, amount of condensed fuel or oil present in the exhaust stack 118, 118a etc.

INDUSTRIAL APPLICABILITY

The operation of the micro grid power system 100 is described. During operation, the controller 112 determines the external load 102 connected to the common bus 110. Based on the connected external load 102, the controller 112 controls the plurality of the generator sets 106. The controller 112 may control the plurality of the generator sets 106 so as to operate one or more generator sets 106 to power a portion of the external load 102. Before operating the one or more generator sets 106, the controller 112 may determine the number of generator sets 106 to be operated based on the external load 102, power ratings of each generator set 106, and the maximum power output capacity of the photovoltaic system 108. Additionally, or optionally, the controller 112 may determine the number of generator sets 106 to be operated based on the operating efficiency of the engine 114 of each generator set 106. Therefore, the controller 112 may control the plurality of generator sets 106 such that some generator sets 106 are operated to provide power and thus a load is added on those generator sets 106, while the other generator sets 106 are deactivated.

The controller 112 operates each running generator set 106 such that temperature of exhaust gases, exiting the associated engine 114, measured by the associated sensor 120, is at or above the threshold temperature. This ensures that the condensation of any fuel or oil present in the exhaust gases is prevented inside the exhaust stack 118, and thereby occurrence of slobber is prevented.

The threshold temperature may be determined based on the type of fuel used for operating the engine 114. The threshold temperature may also depend upon the distance of the sensor 120 from the outlet 122 of the exhaust stack 118. The threshold temperature is determined or calculated such that the condensation of the constituents of the exhaust gases such as oil droplets or unburned fuel does not occur inside the exhaust stack 118. Therefore, the threshold temperature depends on the condensation temperature of the type of fuel being used for operating the engine 114. In an embodiment, the value of the threshold temperature may be stored in a memory of the controller 112.

In an embodiment, the controller 112 may determine the threshold temperature based on the type of fuel. In such a case, the controller 112 may determine the threshold temperature by estimating one or more parameters such as a calorific value of the fuel used for operating the engine 114. The controller 112 may include maps, tables or a model, for determining the threshold temperature based on the estimated one or more parameters. The controller 112 may also calculate the threshold temperature based on the composition of the exhaust gases exiting the engine 114.

Further, the controller 112 determines a remaining load which is the portion of the external load 102 powered by the plurality of generator sets 106 subtracted from the external load 102. Based on the determination of the remaining load, the controller 112 controls the photovoltaic system 108 to provide power to the common bus 110 to power the remaining load. In certain scenarios, the power required to power the remaining load may be less than the maximum power output capacity of the photovoltaic system 108. In such scenarios, the controller 112 may limit the power output from one or more photovoltaic panels 126 by controlling associated inverters. Alternatively, the controller 112 may direct a portion of the electric power generated by the photovoltaic system 108 to the electric storage device such as the battery for later use.

Further, in another scenario, the power required to power the remaining load may be greater than the maximum power output capacity of the photovoltaic system 108. In such a case, the controller 112 operates the photovoltaic system 108 at the maximum power output capacity and provides all the power from the photovoltaic system 108 to the external load 102. The controller 112 provides the remaining power by controlling the plurality of generator sets 106. In certain implementations, the controller 112 may increase a power output of engines 114 of the operating generator sets 106, thereby increasing a load on the operating generator sets 106 to meet the power required to operate the external load 102. Alternatively, the controller 112 may start an additional generator set 106 to provide the remaining power when the photovoltaic system 108 is operating at the maximum power output capacity. In such a case, the controller 112 operates the additional generator set 106 such that the temperature of the exhaust gases measured by the associated sensor 120 inside the associated exhaust stack 118 is maintained at or above the threshold temperature. In doing so, the controller 112 may reduce the load on the other operating generator sets 106. However, the controller 112 reduces the load on the other operating generator sets 106 such that the temperature of the exhaust gases, determined by the respective sensors 120, does not drop below the threshold temperature.

Additionally, when the controller 112 determines an increase in the external load 102, the controller 112 increases the power output of the photovoltaic system 108 to the common bus 110 corresponding to the increase in the external load 102. Once the photovoltaic system 108 operates at the maximum power output capacity, the controller 112 increases the power output or the load on the plurality of generator sets 106 to meet the increase in the external load 102. The controller 112 may control the plurality of generator sets 106 to power the external load 102 as described above.

During operation, the controller 112 may determine a reduction in the external load 102. In such a case, the controller 112 reduces the load on the operating generator sets 106 before reducing the power output of the photovoltaic system 108 delivered to the common bus 110. In doing so, the controller 112 reduces the load on the operating generator sets 106 such that temperature of the exhaust gases measured by the associated sensors 120 is maintained at or above the threshold temperature. In certain implementations, the controller 112 may shutdown one or more generator sets 106 to affect a decrease in the load or power output of the plurality of generator sets 106 corresponding to the decrease in the external load 102. In such a case, the controller 112 may distribute the load on the remaining operating generator sets 106 such the temperature of exhaust gases measured by associated sensors 120 remains at or above the threshold temperature.

During a reduction of the load on the generator set 106, the temperature of the exhaust gases determined by the associated sensor 120 may drop below the threshold temperature. In such a case, the controller 112 increases the load on the generator set 106 to increase the temperature of the exhaust gases above the threshold temperature. However, before increasing the load on the generator set 106 or power output of the associated engine 114, the controller 112 may wait for a predefined time duration before initiating the increment or adjustment in the power output of the engine 114. The controller 112 initiates the increment in the power output of the engine after the predefined time duration to ensure that the temperature of the exhaust gases has reached a steady state. The predefined time duration may be determined empirically and stored in the memory of the controller 112. In an exemplary embodiment, the predefined time duration may be 10 seconds.

The controller 112 may employ a proportional integral derivative (PID) control technique to increase or reduce the load or power output of each generator set 106. Alternatively, the controller 112 may increase or decrease the load or power output of each generator set 106 in a stepwise manner.

The micro grid power system 100*a* is operated in a similar manner as that of the micro grid power system 100. As the micro grid power system 100*a* includes a single exhaust stack 118*a* to receive the exhaust gases from engine 114 of each generator set 106, the controller 112 controls the plurality of the generator sets 106 such that the temperature, determined by the sensor 120, of the collective exhaust gases is maintained above the threshold temperature. Therefore, the controller 112 may distribute the load between the generator sets 106 based on the operating efficiency of each generator set 106, and still maintains the temperature of the collective exhaust gases received from the engine 114 of the operating generator sets 106 above the threshold temperature. For example, the controller 112 may operate one generator set 106 at a low load, and the other generator set 106 at high load corresponding to maximum operating efficiency level. In doing so, the exhaust gases exiting the engine 114 of the generator set 106 operating at the low load may have a temperature below the threshold temperature. However, the temperature of the collective exhaust gases is maintained above the threshold temperature. By doing so, the controller 112 may increase the fuel efficiency of the micro grid power system 100*a*, while preventing the occurrence of wet stacking or slobber in the exhaust stack 118*a*. Further, additional sensors may be installed in the exhaust conduit of each engine 114 connecting the exhaust manifold of each engine 114 to the exhaust stack 118*a*. In such a case, the controller 112 may control the load on each generator set 106 or the power output of each engine 114 such that there is no condensation of fuel or oil in the exhaust conduits based on the temperature measurements obtained from the additional sensors.

As the micro grid power system 100*b* does not include the photovoltaic system 108, power for operating the external load 102 is provided by the plurality of generator set 106*a*. Further, the controller 112*a* includes a dedicated control unit 128 for controlling each generator set 106*a*. The control unit 128 of one generator set 106*a* is in communication with the control units 128 of all other generator sets 106*a*. The control units 128 of the generator sets 106*a* communicates information about the load and power output of each generator set 106*a* to each other. By doing so, the control units 128 distribute the load between each other such that power output corresponding to the external load 102 is met. Further, each control unit 128 maintains the load on associated generator set 106*a* to maintain the temperature, measured by the respective sensor 120, at or above the threshold temperature. Further, when there is an increase or decrease in the external load 102, the control units 128 control the power of or load on the plurality of generator sets 106*a* so as to maintain the temperature of exhaust gases inside the exhaust stacks 118 of the operating generator sets 106*a* above the threshold temperature. Therefore, the controller 112*a* controls the plurality of generator sets 106*a* in similar manner as that of the controller 112 of the micro grid power system 100, except that all the power required to operate the external load 102 is provided by controlling the plurality of generator sets 106*a*. Thus, the controller 112*a* controls the plurality of generator sets 106*a* such that wet stacking or slobber is prevented in the exhaust stacks 118, and simultaneously, maximum fuel efficiency is achieved.

Therefore, in general, the foregoing disclosure finds utility in any one of a variety of applications, which may benefit from improved control of wet stacking or slobber of exhaust system and improved fuel efficiency for an engine. More specifically, the disclosed systems and methods may be used to automatically and adaptively aid in operating the engine 114 such that the temperature of exhaust gases along the entire length of an exhaust stack 118, 118*a* remains above the condensation temperature of the oil and unburned fuel present in the exhaust gases and at the same time operating the engine 114 such that the fuel consumption is minimized.

In particular, the disclosed system and method for operating a micro grid power system 100, 100*a*, 100*b* automatically manages the power output or load on one or more engines 114 associated with one or more generator sets 106, 106*a* so as to maintain the temperature of exhaust gases in the exhaust stack 118, 118*a* above the condensation temperature of oil and unburned fuel present in the exhaust gases. The present disclosure, thus, not only enables more effective operation of the engine 114 associated with the generator sets 106, 106*a* and a renewable energy system such as the photovoltaic system 108 at all load levels in general, but also ensures high renewable energy penetration. The present disclosure also enables reduction or prevention of wet stacking of the engines 114—thereby reducing maintenance of the engines 114, while operating the generator sets 106, 106*a* at optimum power output level.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A micro grid power system, comprising:
   a plurality of generator sets, each said generator set including:
      an engine;
      an exhaust stack coupled to the engine to facilitate discharge of exhaust gases exiting the engine; and
      a sensor configured to determine a temperature of the exhaust gases in the exhaust stack;
   an external load powered by the plurality of generator sets; and
   a controller configured to:
      determine an increase of the external load,
      control the plurality of generator sets to meet the increase of the external load, and to maintain the temperature above a threshold temperature for each said generator set, and
      distribute the increased external load between generator sets of the plurality of generator sets such that the temperature of the exhaust gases determined by the sensor of each said generator set is at or above the threshold temperature, and such that respective portions of the external load handled by generator sets, of the plurality of generator sets, that are operating prior to the distributing the increased external load are not increased upon the distribution of the increased external load.

2. The system of claim 1, wherein the sensor is positioned proximal to an outlet of the exhaust stack.

3. The system of claim 1, wherein the threshold temperature corresponds to a condensation temperature of a fuel used for operating the engine.

4. The system of claim 1, wherein the controller includes a dedicated control unit for each generator set for controlling the generator set.

* * * * *